(12) United States Patent
Tamura et al.

(10) Patent No.: US 11,515,662 B2
(45) Date of Patent: Nov. 29, 2022

(54) CONNECTOR UNIT FOR VEHICLE, MOTORCYCLE, AND SUPPORT MEMBER

(71) Applicant: Kawasaki Jukogyo Kabushiki Kaisha, Kobe (JP)

(72) Inventors: Hiroshi Tamura, Akashi (JP); Takeshi Kashihara, Kobe (JP); Kiyotaka Akagi, Ashiya (JP)

(73) Assignee: Kawasaki Motors, Ltd., Akashi (JP)

( * ) Notice: Subject to any disclaimer, the term of this patent is extended or adjusted under 35 U.S.C. 154(b) by 0 days.

(21) Appl. No.: 17/302,873

(22) Filed: May 14, 2021

(65) Prior Publication Data

US 2021/0367373 A1 Nov. 25, 2021

(30) Foreign Application Priority Data

May 25, 2020 (JP) .............................. JP2020-090357

(51) Int. Cl.
*H01R 13/506* (2006.01)
*H01R 13/52* (2006.01)
*B62J 45/00* (2020.01)
*B60L 53/16* (2019.01)

(52) U.S. Cl.
CPC .......... *H01R 13/5213* (2013.01); *B62J 45/00* (2020.02); *H01R 13/506* (2013.01); *B60L 53/16* (2019.02); *B60L 2200/12* (2013.01); *B60L 2200/32* (2013.01); *H01R 2201/26* (2013.01)

(58) Field of Classification Search
CPC .............. H01R 13/5213; H01R 13/506; H01R 13/447; H01R 2201/26; B62J 45/00
See application file for complete search history.

(56) References Cited

U.S. PATENT DOCUMENTS

| 8,454,375 B2* | 6/2013 | Bauer ..................... B60L 53/16 439/135 |
| 10,800,277 B2* | 10/2020 | Hatami ................ H01R 13/516 |
| 2020/0102018 A1* | 4/2020 | Nakanishi .............. B62D 25/12 |

FOREIGN PATENT DOCUMENTS

JP 2019-172162 A1 10/2019

* cited by examiner

*Primary Examiner* — Tho D Ta
(74) *Attorney, Agent, or Firm* — Burr & Brown, PLLC

(57) ABSTRACT

A connector unit for a vehicle includes a connection connector to connect an external connector, and a support member to support the connection connector. The support member includes a cover attachment part attached to a vehicle cover, and a connector support to support the connection connector.

18 Claims, 7 Drawing Sheets

CONNECTOR UNIT FOR VEHICLE, MOTORCYCLE, AND SUPPORT MEMBER

BACKGROUND OF THE INVENTION

Field of the Invention

The present disclosure relates to a connector unit for a vehicle attached to a vehicle cover to connect electronic equipment.

Description of the Background Art

Japanese Patent Application Laid-Open No. 2019-172162 discloses a configuration to install a USB port in a handle cover of a straddle-type vehicle.

In technology disclosed in Japanese Patent Application Laid-Open No. 2019-172162, the USB port is directly provided to the handle cover itself of the straddle-type vehicle. It is thus necessary to design, for each of vehicles having handle covers of different shapes, a unique shape of the USB port.

SUMMARY OF THE INVENTION

It is an object to facilitate design to provide a connection connector to a vehicle cover.

A connector unit for a vehicle includes: a connection connector to connect an external connector; and a support member to support the connection connector, and the support member includes: a cover attachment part attached to a vehicle cover; and a connector support to support the connection connector.

According to the connector unit, the connection connector is attached to the support member. The support member is attached to the vehicle cover. The support member is thus mainly required to have a unique shape to provide the connection connector to the vehicle cover. The vehicle cover is only required to have a configuration to attach the support member, and can have a simplified shape compared with the unique shape to provide the connection connector to the vehicle cover. This can suppress complication of the shape of the vehicle cover due to the unique shape to provide the connection connector to the vehicle cover, and facilitate design to provide the connection connector to the vehicle cover.

These and other objects, features, aspects and advantages of the present invention will become more apparent from the following detailed description of the present invention when taken in conjunction with the accompanying drawings.

DETAILED DESCRIPTION OF THE INVENTION

A connector unit for a vehicle, a motorcycle, and a support member according to an embodiment will be described below. One example of the vehicle to which the connector unit is applied is the motorcycle. The motorcycle is a two-wheeled vehicle on which a power engine is mounted. An example in which the vehicle is the motorcycle will be described in the embodiment below. The vehicle may be another vehicle, such as a straddle-type vehicle (e.g., a motor tricycle, an all-terrain vehicle (ATV), and a personal watercraft (PWC)) driven by a driver as a user straddling a seat.

Figure 1:
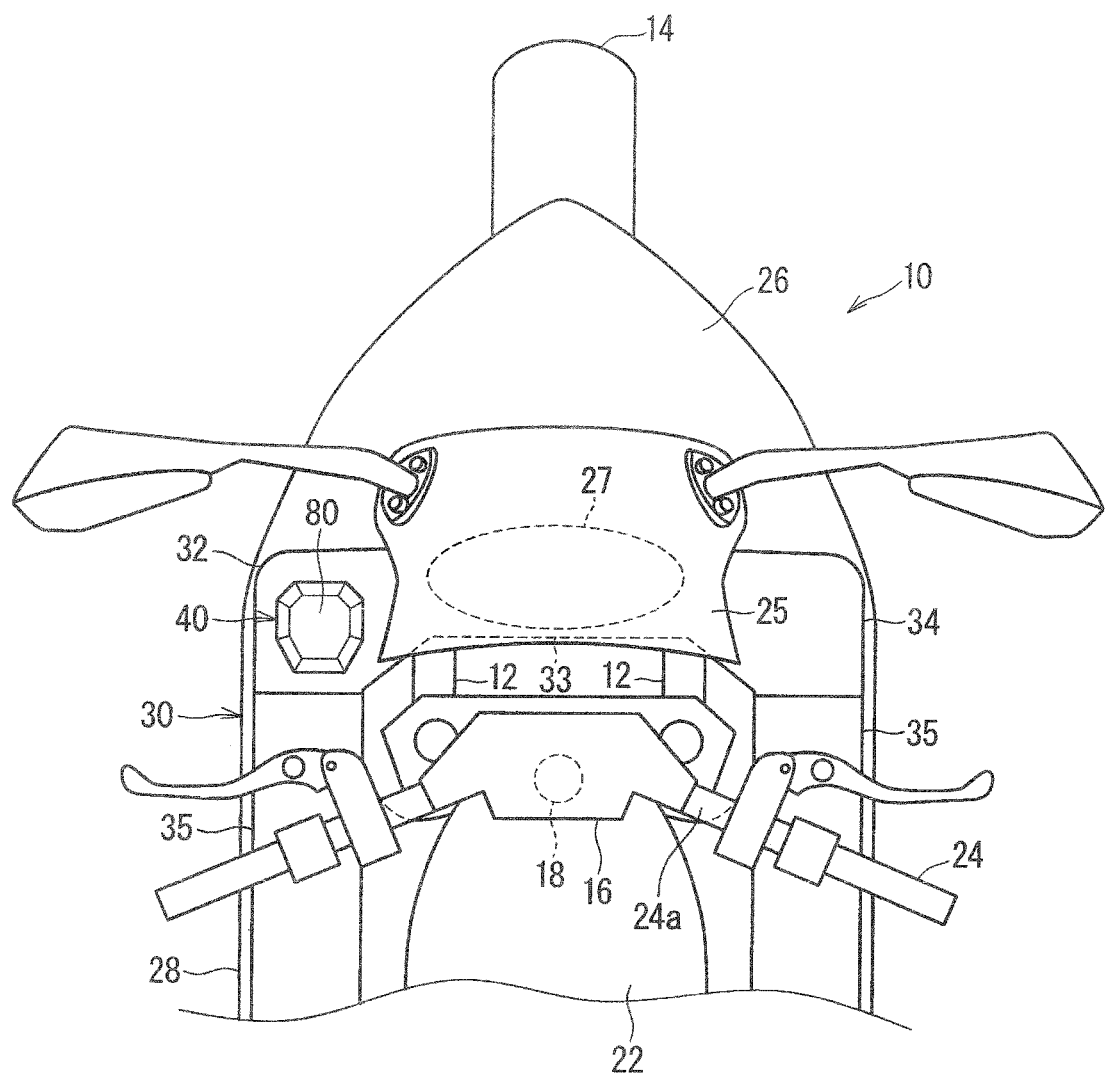
FIG. 1 is a plan view illustrating a motorcycle according to an embodiment.
Figure 1:
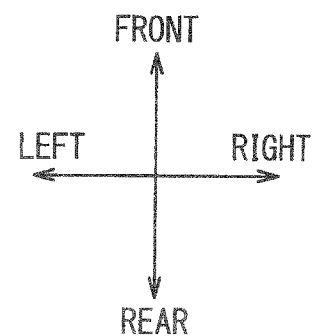

FIG. 1 is a plan view illustrating a motorcycle 10 to which a connector unit 40 for a vehicle is applied. A front part of the motorcycle 10 is illustrated in FIG. 1. When reference is made to the top/bottom, front/rear, and left/right in description made below, each direction is defined as follows. First, a side of the motorcycle 10 on which a front wheel 14 is grounded on a road surface is the bottom, and an opposite side is the top. A side toward which the motorcycle 10 travels is the front, and an opposite side is the rear. The left and right are as viewed from a user riding the motorcycle 10 as a driver is the left and right of the motorcycle 10. A width direction is a direction of the width of the vehicle along a left-right direction.

In the motorcycle 10, the front wheel 14 is rotatably provided at a lower end of a front fork 12. The front wheel 14 rotates at the lower end of the front fork 12 during travel of the motorcycle 10. A pair of upper and lower brackets 16 (the upper bracket is illustrated in FIG. 1) is attached to an upper end of the front fork 12. A steering shaft 18 is supported by the pair of brackets 16. The steering shaft 18 is inserted into a head pipe provided at a front part of a vehicle body frame, and is pivotally supported. A handle 24 is supported by the upper bracket 16. Upon operation of the handle 24, the steering shaft 18, the brackets 16, and the front fork 12 pivot around an axis of the head pipe. The pivot allows for pivot of the front wheel 14 around the axis of the head pipe to change a direction of travel of the motorcycle 10.

A fuel tank 22, an occupant seat, and the like are provided behind the handle 24, and an engine as the power engine is provided below the fuel tank 22 and the occupant seat. The power engine of the motorcycle 10 may be an electric motor. A rear wheel provided at a rear part of the vehicle body frame is rotatably driven by the power engine.

The motorcycle 10 is provided with a vehicle cover 30. The vehicle cover 30 covers at least some of components of the motorcycle 10. One surface of the vehicle cover 30 is exposed to the outside of the motorcycle 10. The vehicle cover 30 may cover any of the components of the motorcycle 10. In the present embodiment, the vehicle cover 30 is provided to surround a part in front of and parts on opposite sides of the handle 24. The above-mentioned vehicle cover 30 is directly or indirectly supported by the vehicle body frame, and does not move with pivot of the handle 24. The vehicle cover 30 is made of resin, for example, and includes a front cowl 26, an outer side cowl 28, and an inner cover 32. The vehicle cover 30 may integrally be formed, may be formed by being separated into the front cowl 26, the outer side cowl 28, and the inner cover 32, or may be formed by being further separated into smaller parts. The front cowl 26 is directly or indirectly attached to the vehicle body frame to cover the outside of the part in front of the handle 24. The outer side cowl 28 is directly or indirectly attached to the vehicle body frame to cover the outside of the parts on opposite sides of the handle 24. The inner cover 32 is directly or indirectly attached to the vehicle body frame to surround the part in front of and the parts on opposite sides of the handle 24 on the inside of the front cowl 26 and the outer side cowl 28 in a horizontal direction of a vehicle body.

A gauge 27 is provided to a part of the inner cover 32 located in front of the handle 24. That is to say, the inner cover 32 is one example of a vehicle cover provided around the gauge 27. The gauge 27 is a display to display vehicle information, such as a speed and rpm of an engine. The gauge 27 may display the vehicle information in analog form, in digital form, or in complex form.

The inner cover 32 includes a center part 33, a pair of side parts 34, and a pair of laterally extending parts 35. The center part 33 is located in front of the handle 24 at the center in the width direction. The gauge 27 is attached to the center part 33. The pair of side parts 34 extends outward in the width direction from the center part 33. The side parts 34 extend downward as they extend rearward. That is to say, the side parts 34 are inclined with respect to the horizontal direction. The laterally extending parts 35 extend rearward from the respective side parts 34. The connector unit 40 is supported by one of the above-mentioned side parts 34.

Figure 2:
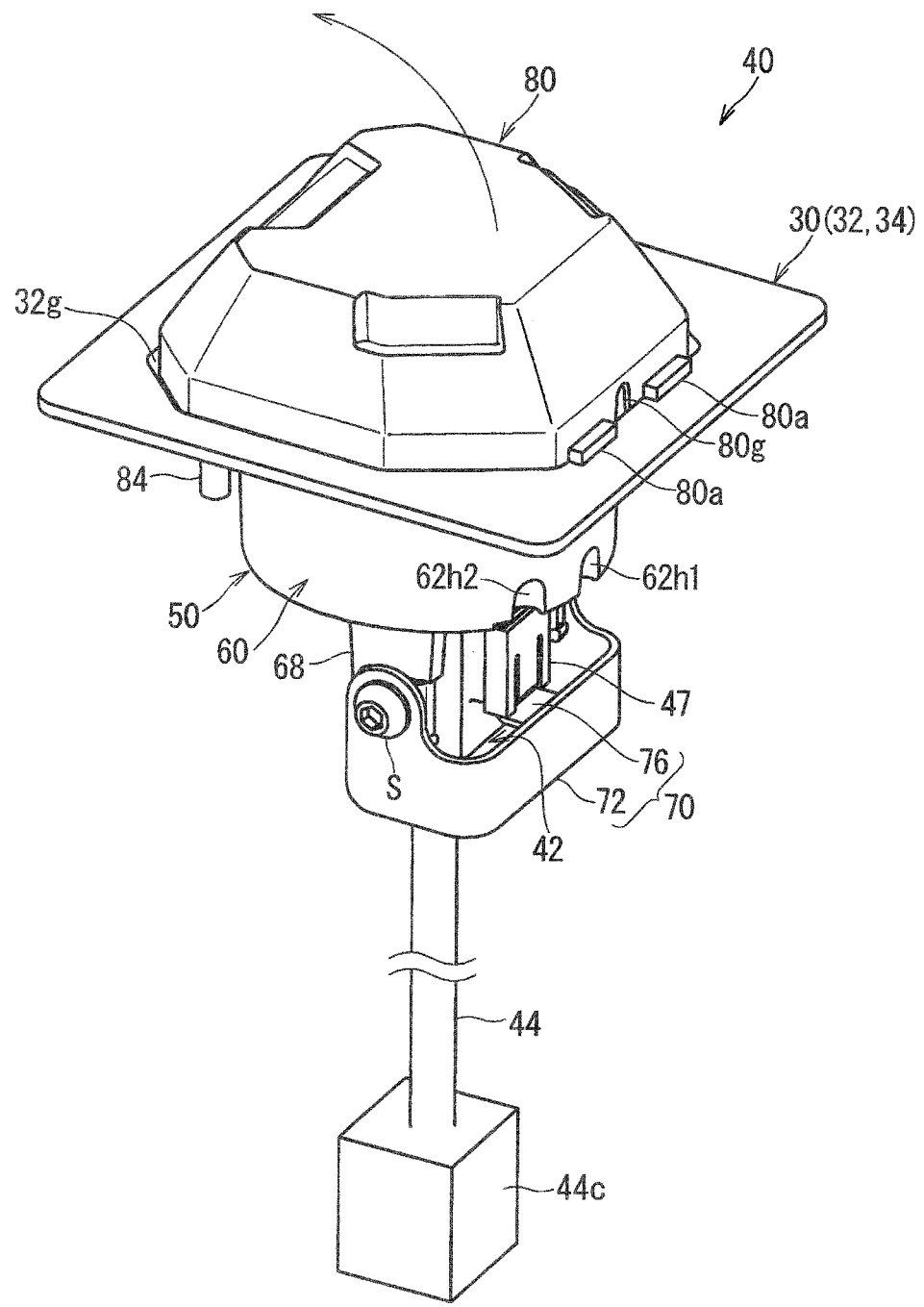
FIG. 2 is a perspective view illustrating a connector unit according to the embodiment.
Figure 3:
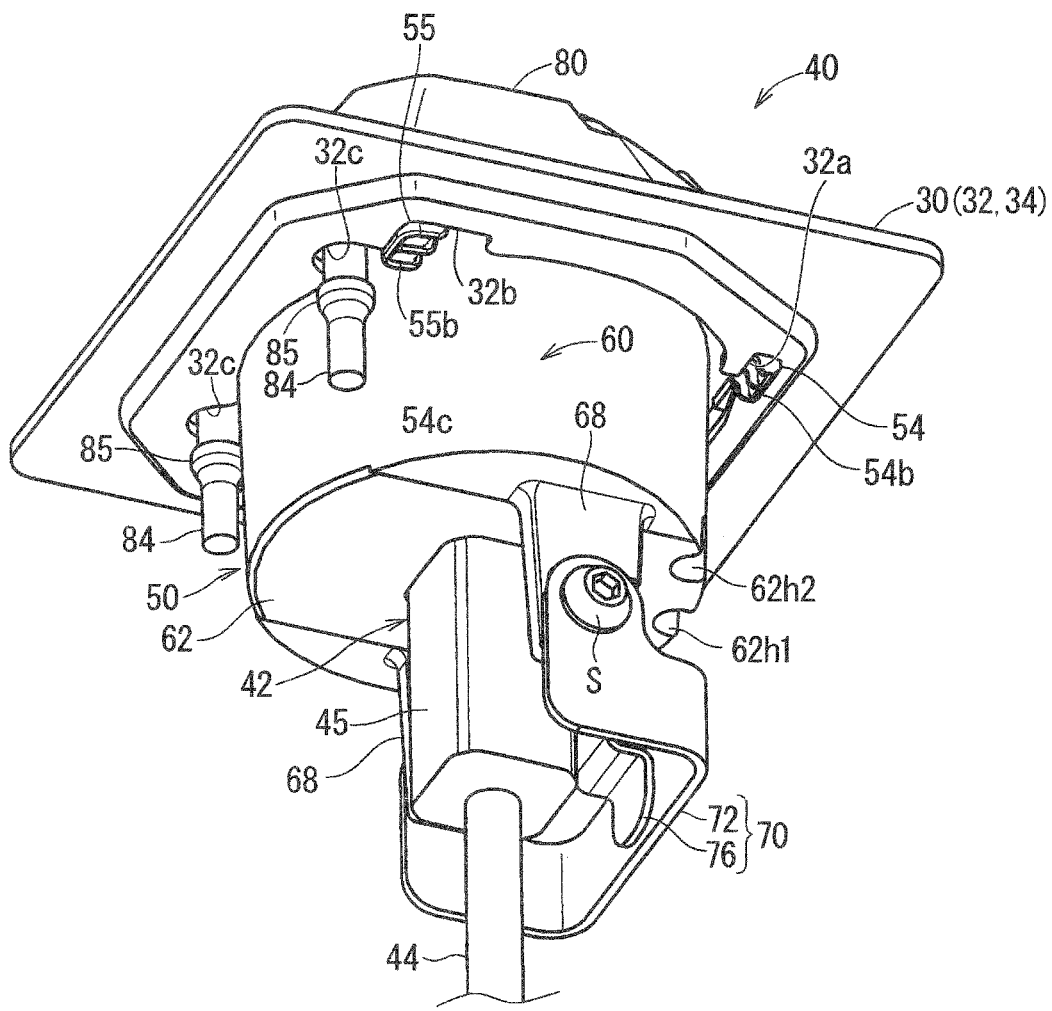
FIG. 3 is a perspective view illustrating the connector unit.
Figure 4:
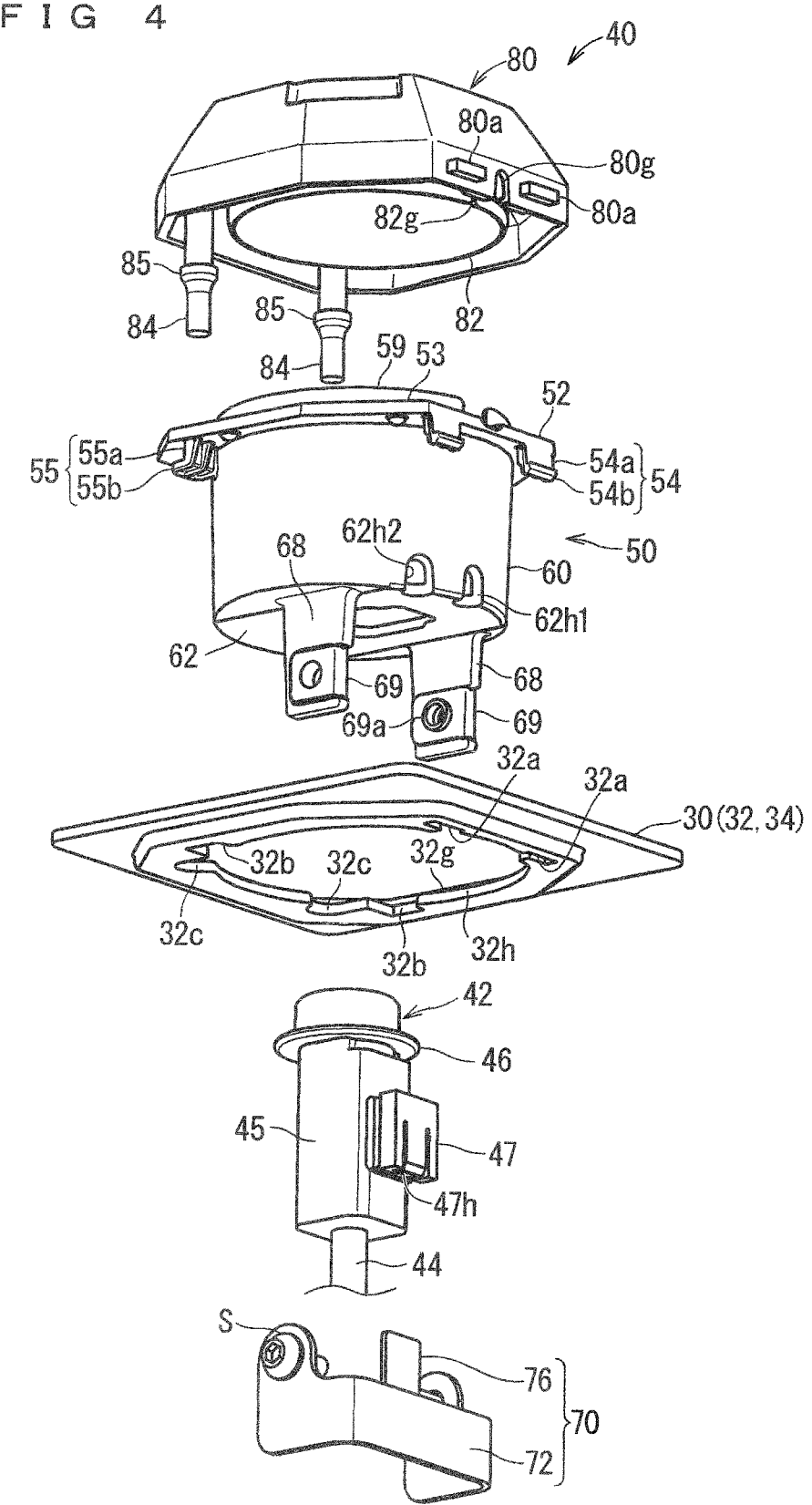
FIG. 4 is an exploded perspective view illustrating the connector unit.
Figure 5:
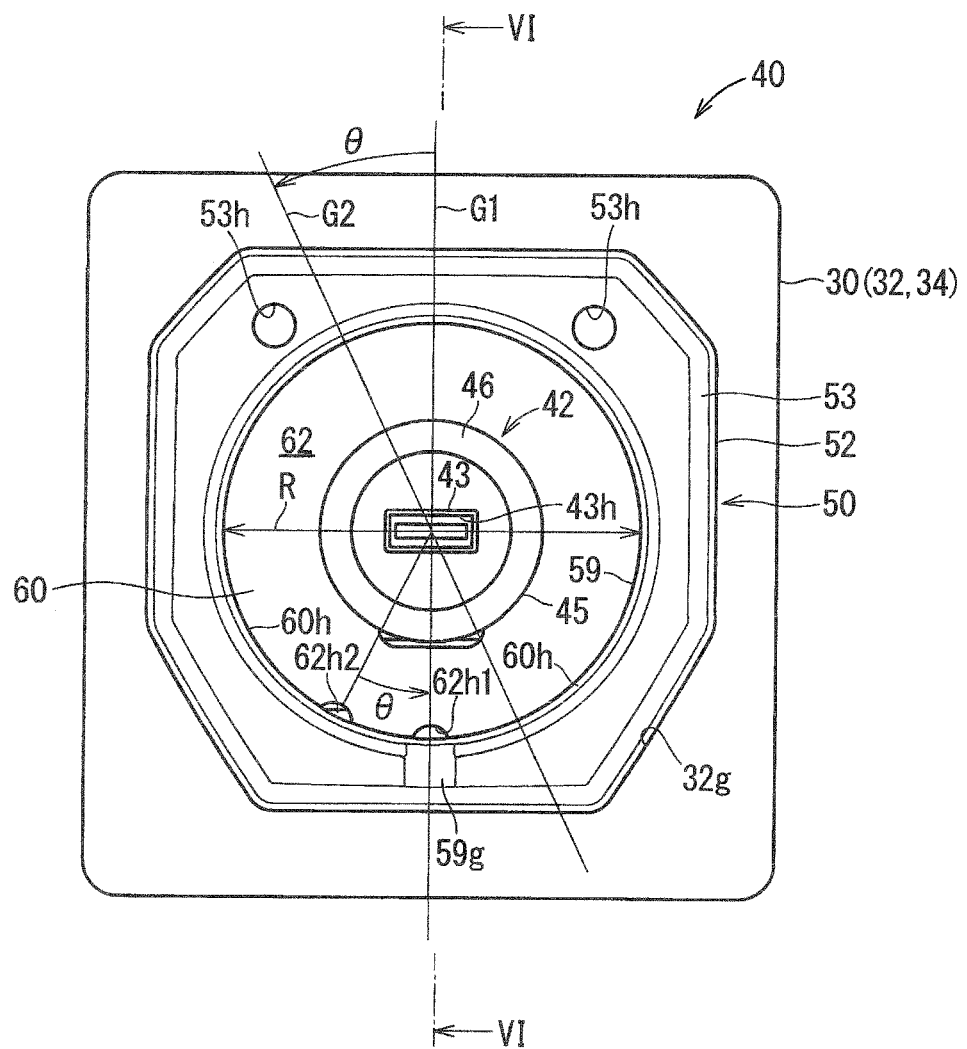
FIG. 5 is a front view illustrating the connector unit.
Figure 6:
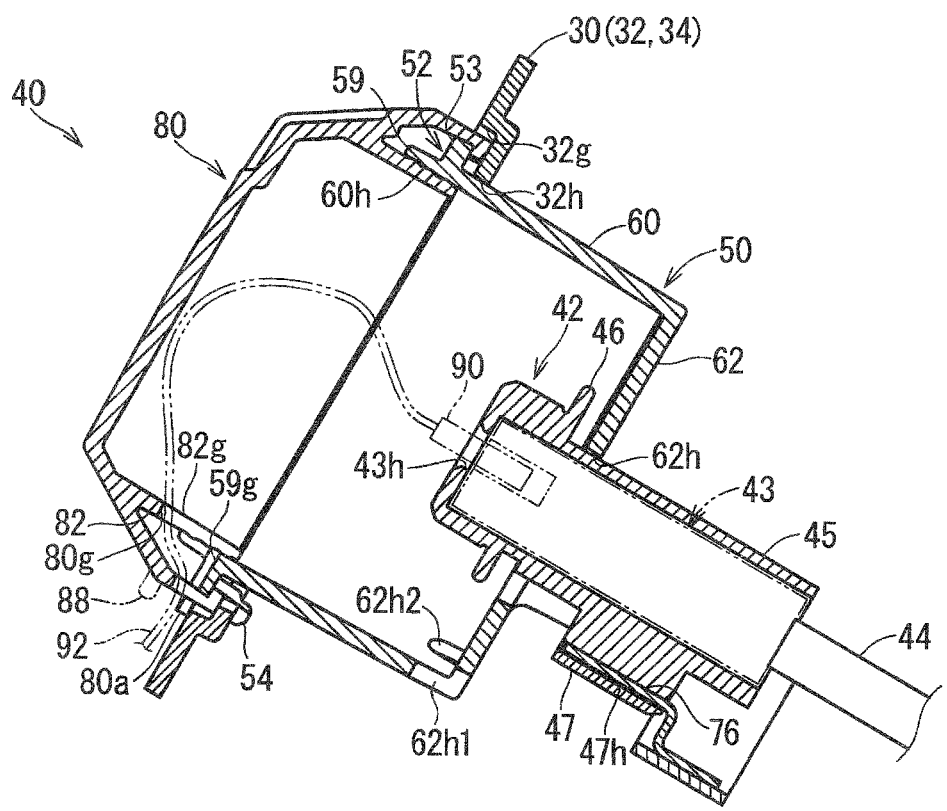
FIG. 6 is a cross-sectional view taken along the line VI-VI of FIG. 5.
Figure 6:
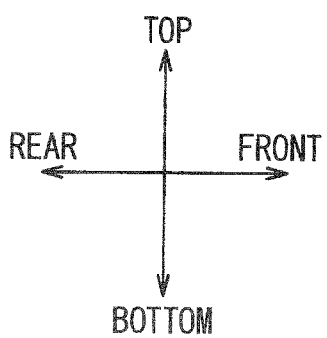

FIGS. 2 and 3 are perspective views illustrating the connector unit 40. FIG. 4 is an exploded perspective view illustrating the connector unit 40. FIG. 5 is a front view illustrating the connector unit 40. FIG. 6 is a cross-sectional view taken along the line VI-VI of FIG. 5. A lid 80 is not illustrated in FIG. 5, whereas the lid 80 is illustrated in FIG. 6. A part of the inner cover 32 to which the connector unit 40 is attached is illustrated as a square planar part in FIGS. 2 to 6. In description made below, the outside of the vehicle cover 30 (inner cover 32) is a side of the vehicle cover 30 on which an occupant is present, that is, a front side of the vehicle cover 30. The inside of the vehicle cover 30 is a side of the vehicle cover 30 on which a member (e.g., the vehicle body frame) protected by the vehicle cover 30 is present, that is, a back side of the vehicle cover 30. One surface of the vehicle cover 30 visible from the occupant is a front surface, and the other surface of the vehicle cover 30 hidden from the occupant is a back surface.

The location of a connector attachment part of the vehicle cover 30 to which the connector unit 40 is attached is not particularly limited. For example, the connector attachment part may be a part of the vehicle cover 30 opposing the driver straddling the vehicle body. The connector attachment part may be a part of the vehicle cover 30 facing generally upward. As in the present embodiment, the connector attachment part may be a part of the vehicle cover 30 located between the handle 24 and a windshield 25 in a front-rear direction. As in the present embodiment, the connector attachment part may be at a location outside the gauge 27 in the width direction and further rearward than the gauge 27. As in the present embodiment, the connector attachment part may be at a location further forward than a handle bar 24a in a straight-ahead state. As in the present embodiment, the connector attachment part may be at a location further forward than the upper end of the front fork 12 in a straight-ahead state. The connector attachment part may be located to be offset from the center in the width direction to a kickstand. The connector attachment part may be located in a part to cover a region surrounding an area in which the front fork 12 pivots from above.

The connector unit 40 includes a connection connector 42, a support member 50, and the lid 80.

The connection connector 42 is a connector to connect an external connector 90 (see FIG. 6). The connection connector 42 is electrically connected to an internal electrical component mounted on the motorcycle 10. The connection connector 42 is only required to removably mate with the external connector 90 to electrically connect equipment provided on a side of the motorcycle 10 and equipment external to the motorcycle 10 to enable signal transfer or power supply. For example, power is supplied, through the external connector 90 and the connection connector 42, from a power supply unit (battery) mounted on the motorcycle 10 to equipment to which the external connector 90 is connected. The connection connector 42 may be a connector for signal transfer or a connector for power supply, for example. Specifically, the connection connector 42 may be a universal serial bus (USB) connector or an accessary socket. The USB connector may be a type A USB connector or a type C USB connector. In the present embodiment, an example in which the connection connector 42 is a type A USB female (receptacle) connector, and the external connector 90 is a type A USB male (plug) connector will be described as one example. The external connector 90 is an electrical connector electrically connected to the equipment external to the motorcycle 10. For example, a cable 92 including a wire connected to a terminal within the external connector 90 is connected to a proximal end of the external connector 90. The cable 92 extends outward from the proximal end of the external connector 90, and is connected to the external equipment. The external equipment is a mobile terminal, such as a smartphone, of the occupant of the two-wheeled vehicle, for example.

The connection connector 42 includes a connector body 43 and a connector case 45 (see FIG. 6). The connection connector 42 may generally be in the form of a rod. The connector body 43 includes a mating part with which the external connector 90 mechanically mates. When the connection connector 42 is assumed to be generally in the form of a rod, the mating part may be at an end (a leading end) in a direction of an axis of the connection connector 42. When the connection connector 42 is assumed to be generally in the form of a rod, the direction of the axis of the connection connector 42 may be parallel to a direction of attachment and removal of the external connector 90. That is to say, a direction of the depth of a recess of the mating part may be parallel to the direction of the axis of the connection connector 42 as a whole.

The connector body 43 has a recess at a leading end thereof, and the above-mentioned external connector 90 is inserted into the recess for connection. The recess at the leading end of the connector body 43 is in the form of a rectangular recess that is longer in one direction. A cable 44 extends from a proximal end of the connector body 43. The cable 44 includes a plurality of wires. The plurality of wires are connected to a terminal within the connector body 43. The cable 44 is directed to the inside of the vehicle cover 30 (to the inside of the inner cover 32 as a part of the vehicle cover 30 in the present embodiment), and is connected to the power supply unit, a control unit, and the like on the inside of the inner cover 32 through another connector 44C.

The connector case 45 is a member made of resin, for example, and has a container capable of storing the connector body 43 therein. In the present embodiment, a leading end of the connector case 45 is in the form of a short cylinder, and a part extending from an intermediate part in a longitudinal direction to a proximal end of the connector case 45 is in the form of a cuboid. The connector case 45 has a disk-shaped connector-side flange 46 at a location between the short cylindrical part and the cuboid part. The connector case 45 has, at the leading end thereof, a hole 43*h* to expose the recess at the leading end of the connector body 43 to the outside. The hole 43*h* is in the form of a rectangular hole that is longer in a direction corresponding to the direction of the recess at the leading end of the connector body 43. The external connector 90 is connected to the inside of the recess at the leading end of the connector body 43 through the hole 43*h* in a state of the connector body 43 being contained in the connector case 45. The connector body 43 is held at a fixed location in a state of being contained in the connector case 45 from the proximal end thereof. For example, the connector body 43 is held not to be pulled out of the connector case 45 by a catch structure of a protrusion formed on one of the connector body 43 and the connector case 45 and a recess formed in the other one of the connector body 43 and the connector case 45. Alternatively, the connector body 43 is held in the connector case 45 by screwing, by an adhesive, and the like.

A support base 47 is formed on a part of an outer periphery of the connector case 45. The support base 47 is formed to protrude from one side surface of the cuboid part of the connector case 45. The support base 47 has a recess 47*h* extending from a base to the leading end of the connector case 45. When the connector unit 40 is in a state of being attached to the inner cover 32, the recess 47*h* opens toward the proximal end of the connector case 45, and has been recessed toward the leading end of the connector case 45. A connector support piece 76, which will be described below, is inserted into the recess 47*h*, so that the connection connector 42 is supported at a fixed location with respect to a cover attachment part 52.

The support member 50 is a member to support the connection connector 42. More specifically, the support member 50 is formed separately from the vehicle cover 30. The support member 50 is attached to the inner cover 32 as a part of the vehicle cover 30 through the cover attachment part 52, which will be described below. The support member 50 has a structure to attach the connection connector 42. The support member 50 is attached to the vehicle cover 30 at a fixed location. The connection connector 42 is attached to the support member 50, so that the connection connector 42 is supported at a fixed location with respect to the vehicle cover 30. In the present embodiment, the support member 50 includes the cover attachment part 52 and a connector support 70. More specifically, the support member 50 includes the cover attachment part 52, a coupling 60, and the connector support 70. In the present embodiment, the cover attachment part 52 and the coupling 60 are members integrally formed of a single resin material.

The cover attachment part 52 is a part attached to the inner cover 32 as a part of the vehicle cover 30. The cover attachment part 52 is attached to an edge of the vehicle cover 30. In the present embodiment, the cover attachment part 52 is attached to an edge of an attachment opening 32*h*. The cover attachment part 52 is attached to the vehicle cover 30, so that the support member 50 is attached to the vehicle cover 30. The connector support 70 is a member to support the connection connector 42. The connector support 70 supports the connection connector 42 at a fixed location and in a fixed position. The cover attachment part 52 and the connector support 70 are coupled by the coupling 60. The connector support 70 is thus supported at a fixed location and in a fixed position with respect to the cover attachment part 52. The cover attachment part 52 is attached to the vehicle cover 30, so that the connection connector 42 supported by the connector support 70 is supported at a fixed location and in a fixed position with respect to the vehicle cover 30. The coupling 60 is a part to couple the cover attachment part 52 and the connector support 70 so that the cover attachment part 52 and the connector support 70 are spaced apart from each other. The connector support 70 is supported by the cover attachment part 52 attached to the inner cover 32 through the coupling 60 at a location spaced apart in the direction of attachment and removal of the external connector 90. The connector support 70 is thereby supported at a location away from the vehicle cover 30 (inner cover 32 as a part of the vehicle cover 30 in the present embodiment) to the inside. Specifically, the connector support 70 is provided at a location away from the cover attachment part 52 to the inside of the vehicle cover 30. The connection connector 42 is supported by the connector support 70 at a location away from the vehicle cover 30 (inner cover 32 as a part of the vehicle cover 30 in the present embodiment) to the inside of the vehicle cover 30.

A configuration of a part of the inner cover 32 to which the connector unit 40 is attached will be described herein. The inner cover 32 has the attachment opening 32*h*. The attachment opening 32*h* is formed to have a size allowing for disposition of a part on a side of an outward opening 60*h* of the coupling 60. A part of the vehicle cover 30 (inner cover 32 as a part of the vehicle cover 32 in the present embodiment) around the attachment opening 32*h* is recessed from the outside to the inside. The recess formed around the attachment opening 32*h* when the inner cover 32 is viewed from the outside is an attachment recess 32*g*.

The attachment opening 32*h* has two first locking recesses 32*a* at a location on one side, for example, at a lower location in a state of being attached to the inner cover 32. The first locking recesses 32*a* are in the form of slits extending in the width direction while being continuous with a part around the attachment opening 32*h*. The attachment opening 32*h* has two second locking recesses 32*b* at a location on the other side, for example, at an upper location in the state of being attached to the inner cover 32. The second locking recesses 32*b* are in the form of square recesses having been recessed outward in the width direction while being continuous with the part around the attachment opening 32*h*. The attachment opening 32*h* has two hinge arrangement recesses 32*c* for arrangement of hinges 84, which will be described below, included in the lid 80 at a location closer to the other side than the second locking recesses 32*b* are, for example, at a location above the second locking recesses 32*b* in the state of being integrated with the inner cover 32. The hinge arrangement recesses 32*c* are in the form of recesses having been recessed upward to have a U-shape while being continuous with the part around the attachment opening 32*h*.

In the present embodiment, the coupling 60 is tubular. The coupling 60 has, on one side in a direction of an axis thereof, the opening 60*h* to open toward the outside of the vehicle cover 30. The opening 60*h* has a minimum width of 80 mm or more, for example. The opening 60*h* is herein circular, and thus is a circular opening having a diameter of 80 mm or more. The cover attachment part 52 is formed on one side in the direction of the axis of the coupling 60. In a state of the cover attachment part 52 being attached to the edge of the attachment opening 32*h* of the inner cover 32, the coupling 60 extends to the inside of the vehicle cover 30 (inner cover 32 as a part of the vehicle cover 30 in the present embodiment) through the attachment opening 32*h*.

The external connector 90 herein has an oblong cross section (a cross section in a direction orthogonal to a direction of mating with the connection connector 42). A user can insert the external connector 90 into the tubular coupling 60 while pinching the external connector 90 between forgers along a short direction (vertical direction). In this insertion state, a sufficiently large space is formed between upper and lower surfaces of the external connector 90 and an inner circumferential wall surface of the tubular coupling 60. A space to arrange the fingers between which the external connector 90 is pinched is sufficiently secured, so that the external connector 90 is easily inserted into the connection connector 42 by inserting the external connector 90 into the coupling 60 while pinching the external connector 90 between the fingers. An annular gap is formed between the leading end of the connection connector 42 and the inner circumferential wall surface in the coupling 60, so that the cable 92 extending from the external connector 90 can easily be contained in a space in the coupling 60 while being bent.

The cover attachment part 52 includes a clamping piece to clamp the edge of the vehicle cover 30 in a direction of the thickness thereof, for example, as a configuration to attach the cover attachment part 52 to the edge of the inner cover 32. In the present embodiment, the cover attachment part 52 includes, as the clamping piece, a flange 53, two elastic catch pieces 54, and two clamping pieces 55.

The flange 53 is in the form of a plate protruding outward from the part on the side of the opening 60h of the coupling 60. The flange 53 extends to be larger than the attachment opening 32h and smaller than the attachment recess 32g of the inner cover 32. In the present embodiment, the attachment recess 32g is octagonal, and the planar part of the cover attachment part 52 is in the form of an octagon smaller than the attachment recess 32g. The planar part of the cover attachment part 52 is thus in contact with the edge of the attachment opening 32h in the attachment recess 32g from outside the vehicle cover 30.

The two elastic catch pieces 54 are formed on a surface of the flange 53 from which the coupling 60 extends, that is, a surface of the flange 53 opposing the inner cover 32 at locations corresponding to the above-mentioned two first locking recesses 32a. Each of the elastic catch pieces 54 includes a planar extension piece 54a extending from the flange 53 in a direction of extension of the coupling 60 and a locking protrusion 54b protruding from a leading end of the extension piece Ma toward an outer periphery of the flange 53. A leading end of the locking protrusion 54b is formed to have an inclined surface having projection dimensions gradually reduced in a direction of extension of the extension piece 54a. Each of the elastic catch pieces 54 elastically deforms in a direction of the thickness of the extension piece 54a to elastically deform from an initial shape in which the locking protrusion 54b is caught by the edge of the vehicle cover 30 in a withdrawing direction in which the locking protrusion 54b caught by the edge is disengaged.

The two clamping pieces 55 are formed on the surface of the flange 53 from which the coupling 60 extends, that is, the surface of the flange 53 opposing the inner cover 32 at locations corresponding to the above-mentioned two second locking recesses 32b. Each of the clamping pieces 55 includes a planar extension piece 55a extending from the flange 53 in the direction of extension of the coupling 60 and a locking protrusion 55b protruding from a leading end of the extension piece 55a toward the outer periphery of the flange 53. The locking protrusion 55b and the above-mentioned locking protrusion 54b protrude in opposite directions. The locking protrusion 55b has larger projection dimensions than the above-mentioned locking protrusion 54b.

An annular wall 59 is formed to protrude from the flange 53 to the front side of the vehicle cover 30. The annular wall 59 is an extension of the tubular coupling 60.

The coupling 60 is in the form of a tube extending from an inner circumferential edge of the cover attachment part 52 to the inside of the vehicle cover 30. The coupling 60 may have a constant diameter along the direction of the axis thereof or may have a diameter gradually reduced toward the inside of the vehicle cover 30 along the direction of the axis thereof. In the present embodiment, the coupling 60 is cylindrical.

The coupling 60 has a bottom 62 on the other side in the direction of the axis thereof, that is, at an end inside the inner cover 32 as a part of the vehicle cover 30. The bottom 62 has a connector disposition hole 62h in which the connection connector 42 is disposed. The connector disposition hole 62h is formed to have a shape allowing for disposition of the cuboid part of the connection connector 42. The connector-side flange 46 of the connection connector 42 is formed to be larger than the connector disposition hole 62h, and the connector-side flange 46 is provided to be closer to the opening 60h than the connector disposition hole 62h is in a state of the connection connector 42 being disposed in the connector disposition hole 62h. In this state, the connector-side flange 46 can hide the connector disposition hole 62h from the outside.

One of the side parts 34 of the vehicle cover 30 to which the connector unit 40 is attached is inclined with respect to the horizontal direction. The bottom 62 is thus an inclined bottom 62 (see FIG. 6) inclined with respect to the horizontal direction in a state of the cover attachment part 52 being attached to the attachment opening 32h of the vehicle cover 30. The inclined bottom 62 has a first drain hole 62h1 and a second drain hole 62h2 at lower locations. The bottom 62 is inclined when the motorcycle 10 is in an upright state. The bottom 62 may be inclined with respect to the horizontal direction when the motorcycle 10 is in a state of being supported by the kickstand.

The bottom 62 may not necessarily be inclined, and may be in a horizontal position or in a vertical position along a direction of gravity.

Assume herein that the motorcycle 10 can change its position between a first position and a second position in which the motorcycle 10 is inclined in a rolling direction from the first position. The first position is a position in which the front wheel 14 and the rear wheel are perpendicular to the road surface, for example, when the motorcycle is traveling straight. A vertical direction perpendicular to gravity when the motorcycle 10 is in the first position is shown as a straight line G1 in FIG. 5. The second position is a position in which the motorcycle 10 is inclined in the rolling direction from the first position, for example. One example of the second position is a position in which, in a case where a kickstand is provided to one side of the motorcycle 10, the kickstand as deployed supports the motorcycle 10 in a standing state while being in contact with the ground. In this case, the motorcycle 10 is supported to be in a position inclined to the kickstand, so that the second position is the position in which the motorcycle 10 is inclined in the rolling direction from the above-mentioned first position. A vertical direction perpendicular to gravity when the motorcycle 10 is in the second position is shown as a straight line G2 in FIG. 5.

The first drain hole 62h1 and the second drain hole 62h2 are formed at locations away from each other in a direction along an edge of the inclined bottom 62. When an angular difference between the above-mentioned first position and second position is 0, for example, the first drain hole 62h1 and the second drain hole 62h2 are formed at locations away from each other by a distance corresponding to a central angle θ with the center of the inclined bottom 62 as the center.

The first drain hole 62h1 is at a lower location than the second drain hole 62h2 when the motorcycle 10 is in the first position. For example, the first drain hole 62h1 is at a lowermost location when the motorcycle 10 is in the first position as the vertical position. Thus, in the event of ingress of water into the coupling 60, the water is smoothly discharged to the outside of the coupling 60 through the first drain hole 62h1. The second drain hole 62h2 is at a lower location than the first drain hole 62h1 when the motorcycle 10 is in the second position. For example, the second drain hole 62h2 is at the lowermost location when the motorcycle 10 stands alone by being supported by the kickstand. Thus, in the event of ingress of water into the coupling 60, the water is smoothly discharged to the outside of the coupling 60 through the second drain hole 62h2.

The connector support 70 is a member to support the connection connector 42. In the present embodiment, the connector support 70 supports the connection connector 42 at a location away from the attachment opening 32h to the inside of the vehicle cover 30.

In the present embodiment, a pair of attachment pieces 68 protrudes from the bottom 62 of the coupling 60. Each of the attachment pieces 68 is in the form of an elongated plate, and extends from the bottom 62 to the inside of the vehicle cover 30 along the direction of the axis of the coupling. The attachment pieces 68 extend parallel to each other. Each of the attachment pieces 68 has a screw insertion hole at a leading end thereof. A U-shaped screwing member 69 is attached to the leading end of the attachment piece 68 to cover opposite surfaces thereof. A boss 69a having a threaded hole is provided to a part of the screwing member 69 located between the pair of attachment pieces 68. The screwing members 69 have screw insertion holes in parts located outside the pair of attachment pieces 68.

The connector support 70 is a member of metal and the like, and includes a support body 72 and the connector support piece 76. By inserting the connector support piece 76 into the support base 47, the connector support 70 is attached to the pair of attachment pieces 68 in a state of supporting the connection connector 42. The connector support 70 and the support base 47 are one-to-one connected in a certain direction, so that attachment in a wrong direction does not occur. The support base 47 has a limitation on insertion upon contact with the connector support piece 76 to prevent the connection connector 42 from sinking from an attachment location into the back of the bottom in the direction of the axis thereof.

The support body 72 includes a spanning piece to extend between the pair of attachment pieces 68, and a pair of side pieces vertically extending from opposite ends of the spanning piece. The spanning piece is in the form of an elongated rectangular plate. The side pieces are in the form of plates extending from the opposite ends of the spanning piece in one direction orthogonal to the spanning piece. Each of the side pieces has a screw insertion hole into which a screw S is inserted. In a state of each of the side pieces overlapping a corresponding one of the attachment pieces 68, the screw S is inserted into the screw insertion hole of the side piece, the screw insertion hole of the screwing member 69, and the screw insertion hole of the attachment piece 68 to be screwed into the threaded hole of the screwing member 69. The support body 72 is thereby attached to the coupling 60. The support body 72 may be attached to the attachment pieces 68 with rivets, or another fitting structure. The connector support 70 and the coupling 60 may not necessarily be formed separately, and may integrally be formed.

The connector support piece 76 is in the form of a square plate extending from the spanning piece toward the bottom 62, More specifically, the connector support piece 76 is bent in the middle in the width direction of the spanning piece to be perpendicular to the direction of the axis of the coupling 60, and is further bent vertically along the direction of the axis of the coupling 60. The connector support piece 76 may be formed integrally with the support body 72, or may be formed separately from the support body 72, and welded, screwed, or riveted to the support body 72. A leading end of the connector support piece 76 is inserted into the recess 47h of the support base 47 of the connection connector 42. In a state of the leading end of the connector support piece 76 being inserted into the recess 47h, a part of the support base 47 facing the inside of the vehicle cover 30 is in contact with a part of the connector support piece 76 bent to be perpendicular to the direction of the axis of the coupling 60. The connection connector 42 is thereby supported at a location further away from the vehicle cover 30 than the bottom 62 is while being positioned by the vehicle cover 30 not to move. In this state, an intermediate part in a longitudinal direction of the connection connector 42 is disposed in the connector disposition hole 62h, and a part of the connection connector 42 closer to the leading end than the connector-side flange 46 is disposed to be closer to the vehicle cover 30 than the bottom 62 is. A proximal end of the connection connector 42 is disposed to extend away from the vehicle cover 30 than the bottom 62 is. In this state, the leading end of the connection connector 42 is disposed, in the tubular coupling 60, to be closer to the bottom 62 than a middle location in the direction of the axis of the coupling 60 is. When the leading end of the connection connector 42 is long in one direction as viewed from a side of the leading end in a direction of connection as with a USB connector, the connection connector 42 may be in a position in which a longitudinal direction thereof is along the horizontal direction. If the longitudinal direction of the leading end of the connection connector 42 is along the vertical direction, a lowermost end of the leading end becomes closer to a lower part of the coupling 60. If the longitudinal direction of the leading end of the connection connector 42 is along the horizontal direction, the lowermost end of the leading end is away from the lower part of the tubular coupling 60, and is less likely to be soaked in water and the like.

The connection connector 42 may not be fixed to the vehicle body frame and the like as it is attached to the vehicle cover 30 through the cover attachment part 52 and the coupling 60.

The support member 50 is provided with the lid 80. The lid 80 can be closed to cover the connection connector 42 and be open to expose the connection connector 42 to the outside of the vehicle cover 30. The lid 80 may be omitted, but the connection connector 42 is protected, and further a waterproof effect can be obtained by covering the connection connector 42 with the lid 80. An edge of the lid 80 fits between the support member 50 and the vehicle cover 30 to stop displacement of the lid 80. In the present embodiment, the whole region along the periphery of the edge of the lid 80 fits between the support member 50 and the vehicle cover 30 to easily prevent falling out of the lid 80.

The lid 80 is provided to the cover attachment part 52 to be recessed away from the connector support 70. The lid 80 is in the form of a dome. More specifically, the lid 80 is in the form of a dome having an octagonal base gradually reduced in size to a flat top. An opening of the lid 80 opposing the top has a shape corresponding to the attachment recess 32g around the attachment opening 32h of the vehicle cover 30. The lid 80 can cover the attachment opening 32h so that an edge of the opening of the lid 80 mates with the attachment recess 32g. Although a material for the lid 80 is not particularly limited, the lid 80 may be formed of an elastic material, such as rubber. An inner tube 82 is formed in the lid 80. The inner tube 82 extends toward the opening 60h of the coupling 60 in a state of the lid 80 covering the attachment opening 32h. In the present embodiment, the inner tube 82 is formed to fit an inner circumferential surface of the annular wall 59. Since the inner tube 82 fits the inside of the annular wall 59, ingress of water flowing between the coupling 60 and the lid 80 is suppressed.

The lid 80 is supported by the cover attachment part 52 to be openable as described below. That is to say, the lid 80 has the hinges 84 in the form of rods. In the present embodiment, an upper part of the lid 80 has two hinges 84. The hinges 84 are formed adjacent to each other in the width direction. Each of the hinges 84 has a large diameter part 85 at an intermediate location in the longitudinal direction thereof. A part of the large diameter part 85 closer to a leading end of the hinge 84 is tapered to the leading end of the hinge 84.

The flange 53 of the cover attachment part 52 has hinge attachment holes 53h (see FIG. 5). Each of the hinge attachment holes 53h has a smaller diameter than the large diameter part 85 of the hinge 84. The leading ends of the hinges 84 are pulled in a state of the hinges 84 being inserted into the hinge attachment holes 53h, so that the large diameter parts 85 deform to have a reduced diameter, and can pass through the hinge attachment holes 53h. The large diameter parts 85 return to an original shape after passing through the hinge attachment holes 53h to lock the large diameter parts 85 in the hinge attachment holes 53h so that the hinges 84 are not fallen out of the hinge attachment holes 53h. The lid 80 is thereby supported by the cover attachment part 52. The attachment part is a part of the lid 80 supported by the cover attachment part 52.

The hinges 84 are formed of an elastic material, such as rubber. The hinges 84 elastically deform in a state of being attached to the hinge attachment holes 53h, so that the lid 80 can be open and closed around a line connecting the two hinges 84 as an axis.

At least one of the cover attachment part 52 and the lid 80 has a groove in which the cable 92 withdrawn from the external connector 90 is disposed. In the present embodiment, the annular wall 59 has a groove 59g extending from the inside to the outside thereof. The lid 80 and the inner tube 82 respectively have a groove 80g and a groove 82g extending from the inside to the outside thereof. The grooves 59g, 80g, and 82g are formed outward from the center of the coupling 60 in a straight line as viewed from a direction along the axis of the coupling 60. The grooves 59g, 80g, and 82g are on an opposite side of the opening 60h to the above-mentioned hinges 84. In the present embodiment, since the upper part of the lid 80 has the hinges 84, the grooves 59g, 80g, and 82g are formed at a lower location around the opening 60h. The cable 92 withdrawn from a space between the cover attachment part 52 and the lid 80 to the outside through the grooves 59g, 80g, and 82g is thus withdrawn downward. The grooves 59g, 80g, and 82g may not necessarily be formed, and all the grooves 59g, 80g, and 82g may not necessarily be formed.

The lid 80 may have an eave 88 at a location corresponding to the grooves 59g, 80g, and 82g (see FIG. 6). The cave 88 is formed at a location on the top side of the lid 80 compared with the groove 80g, for example. The eave 88 is in the form of a protrusion elongated in the width direction, for example. The eave 88 may have a greater width than the groove 80g. The lid 80 may have, on an outward surface thereof, protrusions 80a to sandwich the groove 80g. The protrusions 80a are located to be in contact with the surface of the vehicle cover 30 when the lid 80 is in a closed state.

In the connector unit 40 having this configuration, the external connector 90 is connected to the connection connector 42. In this state, the cable 92 extending from the external connector 90 extends from the leading end of the connection connector 42 toward the lid 80, and is directed to the grooves 59g, 80g, and 82g while being curved. The space in the tubular coupling 60 and an internal space of the lid expand at the leading end of the connection connector 42. The cable 92 can thus be curved to have a large radius of curvature, and reach the grooves 59g, 80g, and 82g. The cable 92 is withdrawn to the outside of the coupling 60 and the lid 80 through the grooves 59g, 80g, and 82g. The procedure for attaching the connector unit 40 to the motorcycle 10 is shown.

First, the connection connector 42 supported by the support member 50 is prepared. That is to say, the cable 44 and the proximal end of the connection connector 42 are allowed to pass from the tubular space in the support member 50 through the connector disposition hole 62h of the bottom 62. The proximal end of the connection connector 42 and the cable 44 thus extend from the bottom 62. The connector support piece 76 of the connector support 70 is then inserted into the recess 47h of the support base 47 on the outside of the support member 50. Furthermore, the opposite side pieces of the connector support 70 are caused to overlap the respective attachment pieces 68, and are threadably fixed to the respective attachment pieces 68. The connection connector 42 is thereby attached to the support member 50.

The cable 44 is then inserted into the attachment opening 32h of the inner cover 32 from the outside, and the coupling 60 is also inserted into the attachment opening 32h of the inner cover 32 from a side of the bottom 62 thereof to bring the cover attachment part 52 closer to the edge of the attachment opening 32h of the inner cover 32 from the outside. In this case, after the clamping pieces 55 are inserted into the second locking recesses 32b, the cover attachment part 52 is shifted to an upper side of the attachment opening 32h so that the locking protrusions 55b are locked by edges of the second locking recesses 32b from the inside of the vehicle cover 30. In this state, the elastic catch pieces 54 are pushed into the first locking recesses 32a from the outside. In this case, the inclined surfaces at the leading ends of the locking protrusions 54b of the elastic catch pieces 54 are pushed against lower edges of the first locking recesses 32a, and the elastic catch pieces 54 elastically deform in a direction opposite a direction in which the locking protrusions 54b protrude. When the locking protrusions 54b move beyond the lower edges of the first locking recesses 32a, the elastic catch pieces 54 elastically return to an original shape, and the locking protrusions 54b are locked by the edges of the first locking recesses 32a from the inside of the vehicle cover 30. The edge of the attachment opening 32h is thereby clamped in a direction of the thickness thereof between the flange 53 of the cover attachment part 52 and the locking protrusions 55*b* of the clamping pieces 55. The edge of the attachment opening 32*h* is also clamped in the direction of the thickness thereof between the flange 53 of the cover attachment part 52 and the locking protrusions 54*b* of the elastic catch pieces 54.

The coupling 60 is thereby attached to the inner cover 32 through the cover attachment part 52. The hinges 84 of the lid 80 are press-fit into the hinge attachment holes 53*h* so that the lid 80 is attached to the support member 50 to be openable.

Attachment of the connector unit 40 to the vehicle cover 30 thus ends.

In the above-mentioned attachment structure, the support member 50 mates with recesses (e.g., the first locking recesses 32*a* and the second locking recesses 32*b*) of the edge of the attachment opening 32*h*. The recesses penetrating the vehicle cover 30 in the direction of the thickness thereof can be formed with formation of the vehicle cover 30. This eliminates the need for newly forming the recesses by processing different from processing of the formation, and can prevent an increase in time of formation.

The cover attachment part 52 is locked by the recesses to prevent the support member 50 from falling out in a direction of the axis thereof or turning around the axis thereof.

The part of the vehicle cover 30 to which the connector unit 40 is attached is generally planar. This can prevent complication of the structure to attach the support member 50.

The recesses have different shapes around the attachment opening 32*h*. In the present embodiment, the first locking recesses 32*a* and the second locking recesses 32*b* have different shapes. This can prevent attachment of the cover attachment part 52 to the vehicle cover 30 in a wrong direction. Since attachment of the cover attachment part 52 in the wrong direction is prevented, attachment of the coupling 60 and the support member 50, and further attachment of the connection connector 42 attached to the support member 50 in a wrong direction can be prevented.

The cover attachment part 52 has the flange 53 being in surface contact with the vehicle cover 30 in a direction of the axis thereof. The flange 53 is annularly formed around the coupling 60. Displacement of the vehicle cover 30 to the inside can thereby suitably be stopped when the external connector 90 is inserted.

According to the connector unit 40, the support member 50, or the motorcycle 10 having such a configuration, the connection connector 42 is attached to the support member 50. The support member 50 is attached to the vehicle cover 30. The support member 50 is thus mainly required to have a unique shape to provide the connection connector 42 to the vehicle cover 30. The vehicle cover 30 is only required to have a configuration to attach the support member 50, and can have a simplified shape compared with the unique shape to provide the connection connector 42 to the vehicle cover 30. This can suppress complication of the shape of the vehicle cover 30 due to the unique shape to provide the connection connector 42 to the vehicle cover 30. Design to provide the connection connector 42 to the vehicle cover 30 can thereby be facilitated. Due to easy design of the vehicle cover 30, the above-mentioned connector unit 40 can easily be deployed to covers for other vehicles.

Since the coupling 60 couples the cover attachment part 52 and the connector support 70 so that the cover attachment part 52 and the connector support 70 are spaced apart from each other, the connector support 70 can be disposed at a location away from the vehicle cover 30 without complicating the structure of the vehicle cover 30. When the connector support 70 is away from the vehicle cover 30, the connection connector 42 is easily supported at a location inside the vehicle cover 30. The location of connection between the connection connector 42 and the external connector 90 is thereby easily disposed inside the vehicle cover 30, and the location of connection is less likely to protrude to the outside of the vehicle.

When the coupling 60 is tubular, the coupling 60 can surround a space into which the external connector 90 is inserted to suppress ingress of foreign matter to the inside of the vehicle cover 30. The connection connector 42 can be located at the back of the coupling 60, so that the coupling 60 can have a space to contain the external connector 90. The connector support 70 is provided further away from the vehicle cover 30 than the coupling 60 is, so that the space in the coupling 60 can be increased.

Since the cover attachment part 52 includes, as the clamping piece to clamp the edge of the vehicle cover 30 in the direction of the thickness thereof, the flange 53, the elastic catch pieces 54, and the clamping pieces 55, the vehicle cover 30 is only required to have a shape to be clamped by the clamping piece. The cover attachment part 52 can thus be attached to the vehicle cover 30 while suppressing complication of the structure of the vehicle cover 30. The shape of the vehicle cover 30 can be simplified to allow for easy design of a die to facilitate removal from the die, for example, and one structure (e.g., the shape around the above-mentioned attachment opening 32*h*) for attachment as designed is easily applicable to various types of vehicle covers 30.

Since the clamping piece includes the elastic catch pieces 54, the connector unit 40 can easily be attached to the vehicle cover 30 using an elastically deforming force and an elastically restoring force of the elastic catch pieces 54.

The flange 53 is in contact with the edge of the attachment opening 32*h* of the vehicle cover 30 from the outside, and the elastic catch pieces 54 are caught on an inside of the edge of the attachment opening 32*h*, so that protruding structures, such as pawl structures, of the vehicle cover 30 can be eliminated or minimized. Since the flange 53 of the cover attachment part 52 is in contact with the vehicle cover 30 from the outside, a force to push the support member 50 to the back is effectively received, for example, when the external connector 90 is connected.

In this case, the part around the attachment opening 32*h* of the vehicle cover 30 has been recessed as the attachment recess 32*g*, so that the flange 53 is less likely to protrude from the vehicle cover 30.

Since the lid 80 is provided to the cover attachment part 52 to be recessed away from the connector support 70, an internal space largely expanding as viewed from the connection connector 42 is formed in the lid 80. The cable 92 extending from the external connector 90 connected to the connection connector 42 is thus easily curved in the tubular internal space of the coupling 60 and the internal space of the lid 80. A part of an inner surface of the lid 80 from an intersection of the inner surface and an extension of the connection connector 42 to the grooves 59*g*, 80*g*, and 82*g* is inclined downward to the grooves 59*g*, 80*g*, and 82*g*. The cable 92 is thus easily guided to the grooves 59*g*, 80*g*, and 82*g*. Adherence of rainwater to the connection connector 42 is prevented to eliminate the need for providing excessive waterproof performance to the connection connector 42.

If the coupling 60 herein has a greater depth, a space to contain the cable 92 can be provided in the coupling 60. In this case, however, it becomes difficult to connect the external connector 90 at the back of the coupling 60. In addition, a space to provide the connector unit 40 may not be secured in the vehicle cover 30. If the lid 80 has a greater depth, a space to contain the cable 92 can be provided in the lid 80. In this case, however, the lid 80 protrudes substantially from the vehicle cover 30. To improve the workability of connection and avoid substantial protrusion of the lid 80, the coupling 60 may have a depth of 4 cm to 6 cm, and the recess of the lid 80 may have a depth of 2 cm to 4 cm, for example. The depth of the recess of the lid 80 may be one half to one times the depth of the coupling 60, for example.

The cable 92 is guided to the outside through the grooves 59g, 80g, and 82g when the lid 80 is in the closed state. If the lid 80 has the eave 88 in this case, water is less likely to enter through the groove 80g by covering the groove 80g with the eave 88.

The above-mentioned eave 88 is a protrusion on an opposite side to the hinges 84, so that the lid 80 can easily be open and closed by engaging a finger with the eave 88, for example.

Since the grooves 59g, 80g, and 82g are on an opposite side to the hinges 84, the cable 92 disposed to pass through the grooves 59g, 80g, and 82g is easily disposed at a location away from an opening and closing trajectory of the lid 80. The lid 80 is thus less likely to be caught by the cable 92 during opening and closing of the lid 80.

In the present embodiment, the hinges 84 of the lid 80 are at a higher location than the other parts of the lid 80 in the direction of gravity. The lid 80 is thus less likely to be open during travel and the like, and rainwater and the like are less likely to enter.

The opening 60h may have a minimum width of 80 mm or more. When the opening 60h is assumed to be circular, for example, the opening 60h may have a diameter R of 80 mm or more. In this case, it is easy to put a hand wearing a glove into the coupling 60, and to withdraw and insert the external connector 90 from and into the connection connector 42 in the coupling 60.

Since the connector unit 40 is attached to the part of the vehicle cover 30 provided around the gauge 27, the occupant can easily withdraw and insert the external connector 90 from and into the connection connector 42. Since the connector unit 40 is attached around the gauge 27, power or signals can be supplied to an accessary device, such as an indicator, provided around the gauge.

In the present embodiment, the connector unit 40 is attached to the side of the kickstand, for example. Due to attachment to the side of the kickstand, the vehicle body itself serves as an eave in an inclined state using the kickstand to easily prevent adherence of rainwater to the connection connector 42.

In the motorcycle 10, the support member 50 supports the connection connector 42 at a location away from the attachment opening 32h to the inside of the vehicle cover 30, so that the connector unit 40 is less likely to protrude from the vehicle cover 30.

Since the inclined bottom 62 has the drain holes 62h1 and 62h2, water on the bottom 62 of the support member 50 flows downward, and is discharged through the drain holes 62h1 and 62h2.

The motorcycle 10 can change its position between the first position and the second position in which the motorcycle 10 is inclined in the rolling direction. For example, water is easily discharged through the first drain hole 62h1 when the motorcycle 10 is in the first position as the vertical position, and is easily discharged through the second drain hole 62h2 when the motorcycle 10 is in the second position in which the motorcycle 10 is supported by the kickstand.

The first drain hole 62h1 may be at the lowermost location of an edge of the bottom 62 when the motorcycle 10 is in the vertical position, and may be at the lowermost location of the edge of the bottom 62 when the motorcycle 10 is in the position in which the motorcycle 10 is supported by the kickstand.

The connector unit 40 may be provided to a side of the motorcycle 10 on which a stand is provided. The occupant thus easily withdraws and inserts the external connector 90 from and into the connector unit 40 when having dismounted from the motorcycle 10. The connector unit 40, however, may be provided to an opposite side of the motorcycle 10 to the side on which the stand is provided.

The connector unit 40 may not necessarily be provided to the side parts 34 of the vehicle cover 30. The connector unit 40 may be provided at another location of the vehicle cover 30, such as the center part 33 and the outer side cowl 28.

When the connection connector 42 is for power supply, power may be supplied only during operation of the engine.

The cover attachment part 52 and the coupling 60 may be formed separately, and integrated by a fitting structure, a screwing structure, and the like.

The connection connector 42 may not necessarily include the connector body 43 and the connector case 45. For example, the connector case 45 may be omitted to directly form the above-mentioned support base 47 on the connector body 43.

The coupling 60 may be cylindrical or elliptic cylindrical, or may have a polygonal tubular shape, such as a triangular tubular shape and a square tubular shape. In response to the shape of the coupling 60, the attachment opening 32h may be circular, elliptical, and polygonal.

The coupling 60 may not necessarily be tubular. For example, the coupling 60 may be in the form of a frame and the like including an elongated member extending from the attachment opening 32h to the inside of the vehicle cover 30, or may have a U-shape lacking a part of a wall surface. The coupling 60 is preferably tubular as in the present embodiment in terms of aesthetics.

A configuration to attach the cover attachment part to the vehicle cover is not limited to that in the above-mentioned example. The cover attachment part may be attached to the vehicle cover by another fitting structure and the like.

A configuration to support the connection connector 42 using the connector support 70 is not limited to that in the above-mentioned example. For example, the bottom of the coupling 60 may have a recess to hold the connection connector. Alternatively, the connection connector may directly be screwed into the bottom of the coupling. In this case, the recess serves as the connector support.

The support member 50 may not necessarily support the connection connector 42 at the location away from the attachment opening 32h to the inside of the vehicle cover 30. The support member may support the connection connector at a location away from the attachment opening to the outside of the vehicle cover. The connection connector 42 may not necessarily be in a position in which the connection connector 42 is perpendicular to the vehicle cover 30. For example, the connection connector 42 may be supported by the support member in a position in which the connection connector 42 is inclined to or horizontal with respect to the vehicle cover 30.

Figure 7:
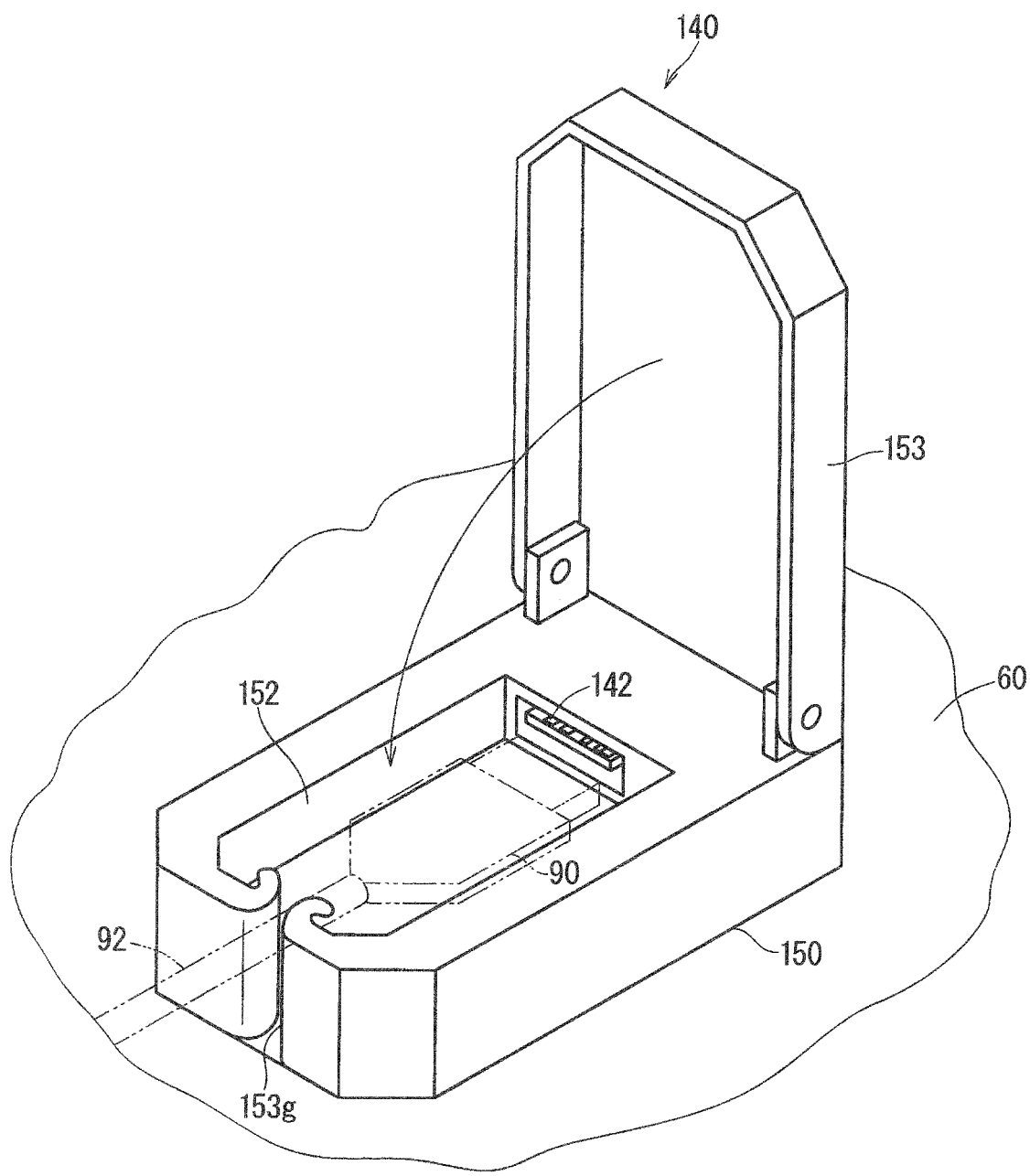
FIG. 7 is a modified view illustrating a connector unit for a vehicle according to a modification.

A connector unit 140 for a vehicle according to a modification illustrated in FIG. 7 includes a connection connector 142 corresponding to the connection connector 42 and a support member 150 corresponding to the support member 50.

The support member 150 is in the form of a thin block, and is attached to the vehicle cover 30. The structure to attach the support member 150 to the vehicle cover 30 may be similar to the structure to attach the above-mentioned support member 50. The support member 150 protrudes on a side of an outer surface of the vehicle cover 30. An outward part of the support member 150 has a containing recess 152. The containing recess 152 is in the form of an elongated recess. The support member 150 has, at one end thereof, a cable insertion groove 153g extending from the containing recess 152 to the outside.

The connection connector 142 is provided at an opposite end of the containing recess 152 to an end at which the cable insertion groove 153g is provided. An end of the connection connector 142 to which the external connector 90 is connected faces the inside of the containing recess 152. The containing recess 152 is formed to have a size allowing for containing of the external connector 90. The containing recess 152 may have a length equal to or greater than the sum of the length of the external connector 90 and the length of an operational space to withdraw and insert the external connector 90 from and into the connection connector 142.

A lid 153 is attached to be openable at an opposite end of the support member 150 to the end at which the cable insertion groove 153g is provided. When the lid 153 is in an open state, the external connector 90 can be disposed inside the containing recess 152, and can be removably connected to the connection connector 142. When the connection connector 142 is in a state of being connected to the external connector 90, the cable 92 is withdrawn from the containing recess 152 to the outside through the cable insertion groove 153g. The lid 153 can pivot in this state to cover and close an opening of the containing recess 152.

As in the present modification, the support member 150 may be at any location with respect to the vehicle cover 30. The connection connector 42 may also be at any location with respect to the vehicle cover 30.

The number of drain holes may be one or three or more, or the drain holes may be omitted.

Configurations described in the above-mentioned embodiment and modification can be combined as appropriate with each other unless any contradictions occur.

In the above-mentioned embodiment, the vehicle cover 30 may be provided to be displaced relative to the vehicle body frame along with the handle 24. Although the vehicle cover 30 has been described to include the inner cover 32 and the outer side cowl 28, this is just an example, and the vehicle cover 30 may have another shape. The present invention may be applied to a naked-type motorcycle or a half cowl-type motorcycle.

As for the relationship between a recess and a protrusion to connect the connection connector 42 and the external connector 90, each of them may be the recess and the protrusion.

The foregoing description is in all aspects illustrative and not restrictive. It is therefore understood that numerous modifications not having been described can be devised without departing from the scope of the invention.

The present specification and drawings disclose the following aspects.

The first aspect is a connector unit for a vehicle including: a connection connector to connect an external connector; and a support member to support the connection connector, wherein the support member includes: a cover attachment part attached to a vehicle cover; and a connector support to support the connection connector. According to the connector unit, the connection connector is attached to the support member. The support member is attached to the vehicle cover. The support member is thus mainly required to have a unique shape to provide the connection connector to the vehicle cover. The vehicle cover is only required to have a configuration to attach the support member, and can have a simplified shape compared with the unique shape to provide the connection connector to the vehicle cover. This can suppress complication of the shape of the vehicle cover due to the unique shape to provide the connection connector to the vehicle cover, and facilitate design to provide the connection connector to the vehicle cover.

The second aspect is the connector unit according to the first aspect, wherein the support member further includes a coupling to couple the cover attachment part and the connector support so that the cover attachment part and the connector support are spaced apart from each other. The connector support can be disposed at a location away from the vehicle cover without complicating the structure of the vehicle cover.

The third aspect is the connector unit according to the second aspect, wherein the coupling is tubular, the cover attachment part is on one side in a direction of an axis of the coupling, the coupling has a bottom at an end on the other side in the direction of the axis of the coupling, and the connector support is provided further away from the vehicle cover than the bottom is. The coupling can thus surround a space into which the external connector is inserted to suppress ingress of foreign matter to the inside of the vehicle cover.

The fourth aspect is the connector unit according to any one of the first to third aspects, wherein the cover attachment part includes a clamping piece to clamp an edge of the vehicle cover in a direction of the thickness thereof. The cover attachment part can be attached to the vehicle cover while suppressing complication of the structure of the vehicle cover.

The fifth aspect is the connector unit according to the fourth aspect, wherein the clamping piece includes an elastic catch piece capable of elastically deforming in a withdrawing direction from an initial shape caught by the edge of the vehicle cover. The connector unit can thereby easily be attached to the vehicle cover using an elastically deforming force and an elastically restoring force of the elastic catch piece.

The sixth aspect is the connector unit according to the fifth aspect, wherein the clamping piece includes a flange being in contact with the edge of the vehicle cover from outside the vehicle cover, and the elastic catch piece is caught on an inside of the edge of the vehicle cover. Protruding structures of the vehicle cover can thereby be eliminated or minimized. Since the flange of the cover attachment part is in contact with the vehicle cover from the outside, a force to push the support member to the back is effectively received, for example, when the external connector is connected.

The seventh aspect is the connector unit according to any one of the first to sixth aspects, wherein the support member is provided with a lid capable of being closed to cover the connection connector and open to expose the connection connector to the outside of the vehicle cover, and the lid is provided to the cover attachment part to be recessed away from the connector support. A space to contain the cable extending from the external connector can thereby be provided in the lid. Waterproof properties are improved by the lid.

The eighth aspect is the connector unit according to any one of the first to seventh aspects, wherein the support member is provided with a lid capable of being closed to cover the connection connector and open to expose the connection connector to the outside of the vehicle cover, at least one of the cover attachment part and the lid has a groove in which a cable withdrawn from the external connector is disposed, and the lid has an eave at a location corresponding to the groove. The cable withdrawn from the external connector can thereby be guided to the outside through the groove when the lid is in the closed state. Ingress of water is suppressed by covering the groove with the eave.

The ninth aspect is the connector unit according to any one of the first to sixth aspects, wherein the support member has an opening to open toward the outside of the vehicle cover, the support member is provided with a lid capable of opening and closing the opening, at least one of the cover attachment part and the lid has a groove in which a cable withdrawn from the external connector is disposed, and the groove is on an opposite side of the opening to a part of the lid supported by the cover attachment part. The cable is thereby withdrawn, to the outside, from the opposite side to the part of the lid supported by the cover attachment part. The cable is thereby easily disposed at a location away from an opening and closing trajectory of the lid, and the connector cover is less likely to be caught by the cable during opening and closing of the lid.

The tenth aspect is the connector unit according to any one of the first to ninth aspects, wherein the support member has an opening to open toward the outside of the vehicle cover, and the opening has a minimum width of 80 mm or more. A rider of the motorcycle 10 thus easily withdraws and inserts the external connector 90 in a state of wearing gloves.

A motorcycle according to the eleventh aspect includes a vehicle cover provided around a gauge, wherein the vehicle cover has an attachment opening, and the connector unit according to any one of the first to tenth aspects is attached to an edge of the attachment opening. According to this aspect, the connector unit is attached to the vehicle cover provided around the gauge, so that the external connector can easily be withdrawn and inserted from and into the connection connector.

The twelfth aspect is the motorcycle according to the eleventh aspect, wherein the support member has a bottom inclined with respect to a horizontal direction when the support member is in a state of being attached to the vehicle cover, and the inclined bottom has a drain hole at a lower location. Water on the bottom of the support member thus flows downward, and is discharged through the drain hole.

The thirteenth aspect is the motorcycle according to the twelfth aspect, wherein the motorcycle is capable of changing a position thereof between a first position and a second position in which the motorcycle is inclined in a rolling direction from the first position, the drain hole includes a first drain hole and a second drain hole, the first drain hole is at a lower location than the second drain hole when the motorcycle is in the first position, and the second drain hole is at a lower location than the first drain hole when the motorcycle is in the second position. The motorcycle can change its position between the first position and the second position in which the motorcycle is inclined in the rolling direction. Water is easily discharged through the first drain hole when the motorcycle is in the first position, and is easily discharged through the second drain hole when the motorcycle is in the second position. For example, the motorcycle can change from a vertical position to a stopping position in which the motorcycle is supported by a kickstand. Water can easily be discharged through the first drain hole when the motorcycle is in the vertical position, and can easily be discharged through the second drain hole when the motorcycle is in the stopping position.

A support member according to the fourteenth aspect includes: a cover attachment part attached to a vehicle cover; and a connector support to support a connection connector. According to the support member, the connection connector is attached to the support member, and the support member is attached to the vehicle cover. The support member is thus mainly required to have a unique shape to provide the external connector to the vehicle cover. The vehicle cover is only required to have a configuration to attach the support member, and can have a simplified shape compared with the unique shape to provide the external connector to the vehicle cover. This can suppress complication of the shape of the vehicle cover due to the unique shape to provide the external connector to the vehicle cover, and facilitate design to provide the external connector to the vehicle cover.

What is claimed is:

1. A connector unit for a vehicle, the connector unit comprising:
   a connection connector to connect an external connector; and
   a support member to support the connection connector, wherein the support member includes
      a cover attachment part attached to an inner side of a vehicle cover,
      a connector support to support the connection connector, and
      a coupling to couple the cover attachment part and the connector support, so that the cover attachment part and the connector support are spaced apart from each other,
   wherein the connector support is located further away from the inner side of the vehicle cover than the cover attachment part.

2. The connector unit according to claim 1, wherein the coupling is tubular,
   wherein the cover attachment part is on one side in a direction of an axis of the coupling,
   wherein the coupling has a bottom at an end on the other side in the direction of the axis of the coupling, and
   wherein the connector support is provided further away from the vehicle cover than the bottom of the coupling is.

3. The connector unit according to claim 1, wherein the support member is provided with a lid capable of being closed to cover the connection connector and open to expose the connection connector to the outside of the vehicle cover, and
   wherein the lid is provided to the cover attachment part to be recessed away from the connector support.

4. The connector unit according to claim 1, wherein the support member is provided with a lid capable of being closed to cover the connection connector and open to expose the connection connector to the outside of the vehicle cover,
   wherein at least one of the cover attachment part and the lid has a groove in which a cable withdrawn from the external connector is disposed, and
   wherein the lid has an eave at a location corresponding to the groove.

5. The connector unit according to claim 1, wherein the support member has an opening to open toward the outside of the vehicle cover,
   wherein the support member is provided with a lid capable of opening and closing the opening, wherein at least one of the cover attachment part and the lid has a groove in which a cable withdrawn from the external connector is disposed, and wherein the groove is on an opposite side of the opening to a part of the lid supported by the cover attachment part.

6. The connector unit according to claim 1, wherein the support member has an opening to open toward the outside of the vehicle cover, and wherein the opening has a minimum width of 80 mm or more.

7. The connector unit according to claim 1, wherein the cover attachment part includes a clamping piece to clamp an edge of the vehicle cover in a thickness direction thereof.

8. The connector unit according to claim 7, wherein the clamping piece includes an elastic catch piece capable of elastically deforming in a withdrawing direction from an initial shape caught by the edge of the vehicle cover.

9. The connector unit according to claim 8, wherein the clamping piece includes a flange being in contact with the edge of the vehicle cover from outside the vehicle cover, and wherein the elastic catch piece is caught on an inside of the edge of the vehicle cover.

10. A motorcycle comprising:
the connector unit according to claim 1; and
the vehicle cover provided around a gauge,
wherein the vehicle cover has an attachment opening, and
wherein the connector unit is attached to an edge of the attachment opening.

11. The motorcycle according to claim 10, wherein the support member has a bottom inclined with respect to a horizontal direction when the support member is in a state of being attached to the vehicle cover, and wherein the inclined bottom of the support member has a drain hole at a lower location.

12. The motorcycle according to claim 11, wherein the motorcycle is capable of changing a position thereof between a first position and a second position in which the motorcycle is inclined in a rolling direction from the first position, wherein the drain hole includes a first drain hole and a second drain hole, wherein the first drain hole is at a lower location than the second drain hole when the motorcycle is in the first position, and wherein the second drain hole is at a lower location than the first drain hole when the motorcycle is in the second position.

13. A support member comprising:
a cover attachment part attached to an inner side of a vehicle cover;
a connector support to support a connection connector; and
a coupling to couple the cover attachment part and the connector support, so that the cover attachment part and the connector support are spaced apart from each other, wherein the connector support is located further away from the inner side of the vehicle cover than the cover attachment part.

14. The support member according to claim 13, wherein the coupling is tubular, wherein the cover attachment part is on one side in a direction of an axis of the coupling, wherein the coupling has a bottom at an end on the other side in the direction of the axis of the coupling, and wherein the connector support is provided further away from the vehicle cover than the bottom of the coupling is.

15. The support member according to claim 13, wherein the support member is provided with a lid capable of being closed to cover the connection connector and open to expose the connection connector to the outside of the vehicle cover, and wherein the lid is provided to the cover attachment part to be recessed away from the connector support.

16. The support member according to claim 13, wherein the cover attachment part includes a clamping piece to clamp an edge of the vehicle cover in a thickness direction thereof.

17. The support member according to claim 16, wherein the clamping piece includes an elastic catch piece capable of elastically deforming in a withdrawing direction from an initial shape caught by the edge of the vehicle cover.

18. The support member according to claim 17, wherein the clamping piece includes a flange being in contact with the edge of the vehicle cover from outside the vehicle cover, and wherein the elastic catch piece is caught on an inside of the edge of the vehicle cover.

* * * * *